United States Patent [19]

Dolch

[11] 4,236,429
[45] Dec. 2, 1980

[54] BLIND RIVET

[76] Inventor: Gernot Dolch, Romerstrasse 216, 6900 Heidelberg 1, Fed. Rep. of Germany

[21] Appl. No.: 755,664

[22] Filed: Dec. 30, 1976

Related U.S. Application Data

[63] Continuation of Ser. No. 622,578, Oct. 15, 1975, abandoned.

[51] Int. Cl.³ .............................................. F16B 13/06
[52] U.S. Cl. .......................................... 85/72; 85/77
[58] Field of Search .................... 85/72, 77, 78, 70, 71

[56] References Cited

U.S. PATENT DOCUMENTS

| | | | |
|---|---|---|---|
| 2,102,230 | 12/1937 | Waterman | 85/72 |
| 3,047,181 | 7/1962 | Heidenwolf | 85/78 X |
| 3,286,580 | 11/1966 | Jeal | 85/77 |
| 3,491,649 | 1/1970 | Smouton et al. | 85/72 X |

FOREIGN PATENT DOCUMENTS

| | | | |
|---|---|---|---|
| 1320197 | 1/1963 | France | 85/72 |
| 335760 | 3/1959 | Switzerland | 85/77 |
| 727942 | 4/1955 | United Kingdom | 85/77 |
| 862797 | 3/1961 | United Kingdom | 85/72 |

*Primary Examiner*—Ramon S. Britts
*Attorney, Agent, or Firm*—Smyth, Pavitt, Siegemund, Jones & Martella

[57] ABSTRACT

A hollow rivet and a setting mandrel are injection molded of thermoplastic material to form a single piece blind rivet or a blind rivet type foot of a fastener for moldings and the like. A draw shank and an enlarged head of the setting mandrel are interconnected by a break joint, and another break joint connects the mandrel with the surrounding tubular shank of the hollow rivet. Setting pull on the draw shank first ruptures the break joint between the mandrel and the hollow rivet, then sets the rivet, and finally ruptures the break joint between the draw shank and the mandrel head.

5 Claims, 9 Drawing Figures

BLIND RIVET

This is a continuation, of application Ser. No. 622,578, filed Oct. 15, 1975, now abandoned.

BACKGROUND OF THE INVENTION

The invention relates to blind rivets and blind rivet type fastening devices which may be used for blind riveting various attachments to workpieces for instance of sheet metal.

Swiss Pat. No. 501846 discloses blind rivets which consist of a single piece of the same material. It specifies as manufacturing materials aluminum, copper, mild steel and also synthetic material. Proper functioning of this type of rivet, however, cannot be warranted, particularly if it is made of synthetic material because it would not stand the required deformation for the setting of the rivet. If a hard synthetic material is used for making the blind rivet, it would break during setting, and if a soft synthetic material is used, the blind rivet would after setting revert to its original shape due to the elasticity of the synthetic material.

Other heretofore known blind rivets according to Austrian Pat. 222436 consist of two parts. They comprise a hollow rivet of relatively soft material as for instance mild steel and are provided with a manufactured head. Non-separably connected with the hollow rivet is a setting mandrel of hard material, for instance tool steel. The mandrel has a draw shank which projects from the head end of the hollow rivet to provide for clamping it into a rivet setting device of well-known type. At its other end the setting mandrel has an enlarged head which is larger than the cylindrical or conical through bore of the hollow rivet. Behind the enlarged head and progressively in the direction of the draw shank, the mandrel is provided with a rib, a milled shaft section, another rib, a break off connection and finally with an upsetting cone. These individual mandrel portions all have different diameters which are larger than the draw shank diameter. During the setting of the blind rivet the through bore of the hollow rivet is plastically enlarged or deformed by the upsetting and enlarging cones, respectively, and the enlarged mandrel head together with the hollow rivet form a closure head or cap. After the closure head or cap has been formed the draw shank separates from the mandrel at the break-off connection.

Blind rivets of this type are unsuitable for use in various kinds of attachment fastening devices. Moreover, these prior art blind rivets are not detachable. The hollow rivet and the setting mandrel must be manufactured separately and then assembled into a blind rivet. This makes conventional blind rivets definitely expensive.

West German petty Pat. No. 1,993,274 discloses a mounting body with a spreading device of synthetic material, in which the spreading bolt is retained by a sprayed on film in order to avoid tipping during the insertion impact.

SUMMARY OF THE INVENTION

The object of the present invention is to provide a rivet which can be used for blind riveting or as a blind rivet type fastener foot, which lends itself readily to mass production, which can be installed in one operation by means of an inexpensive tool, which provides a very secure seat due to a perfect interlock of the mandrel head with the produced closure head, which affords a leakproof, for instance water tight, seal, and which after installation may be disconnected again in a simple and convenient manner. Moreover, the closure head is to have an optically satisfactory configuration and the blind rivet should be corrosion proof.

The invention achieves this object by the provision of a rivet which can be used for blind riveting or as a blind rivet foot of a fastener for attachment to workpieces for instance of sheet metal, which comprises a hollow rivet having a setting head and an associated setting mandrel having an enlarged head which during the setting retraction of the mandrel forms a closure head out of the free end of the hollow rivet, and wherein the draw shank of the mandrel breaks off at a breaking point after the closure head has been formed. The blind rivet and associated setting mandrel according to the invention consists of thermoplastic material and form a single piece and the hollow rivet and mandrel are connected together by a break joint.

The invention further contemplates a unitary hollow rivet and associated setting mandrel of the above outlined character wherein the through bore of the hollow rivet tapers toward the break joint end of the hollow rivet in such a manner as to provide a squirted-on beading around and enveloping the mandrel head, and wherein the break joint between the hollow rivet and the setting mandrel is located between the tubular shank of the hollow rivet and the setting mandrel at the end of the tubular rivet shank.

The invention further contemplates the provision of a unitary hollow rivet and associated setting mandrel of the above outlined character wherein the diameter of the setting mandrel is substantially smaller than the diameter of the through bore of the hollow rivet, wherein the head of the setting mandrel has a spherical configuration, wherein the head of the setting mandrel is cone shaped and provided with a ball head within the zone in which the diameter of the head is substantially larger than the diameter of the through bore of the hollow rivet.

The herein disclosed invention makes it possible to mass produce blind rivets with simple tools for instance by forming them of thermoplastic synthetic material in an injection molding machine or press. In this way the blind rivets can be produced cheaply and marketed at a very low price. The use of synthetic material renders the blind rivets corrosionproof and immune against aging. The blind rivets may be set with simple tools, they conform with sheet metal and hole tolerances within wide limits and they provide a secure, tight riveted joint because the head of the setting mandrel is almost completely enveloped. Moreover, the blind rivet can be used as a foot for fasteners as for instance molding fasteners or cable fasteners.

The foregoing and other objects and advantages of the invention will become more fully apparent from the following description of several embodiments of the invention with reference to the accompanying drawings.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
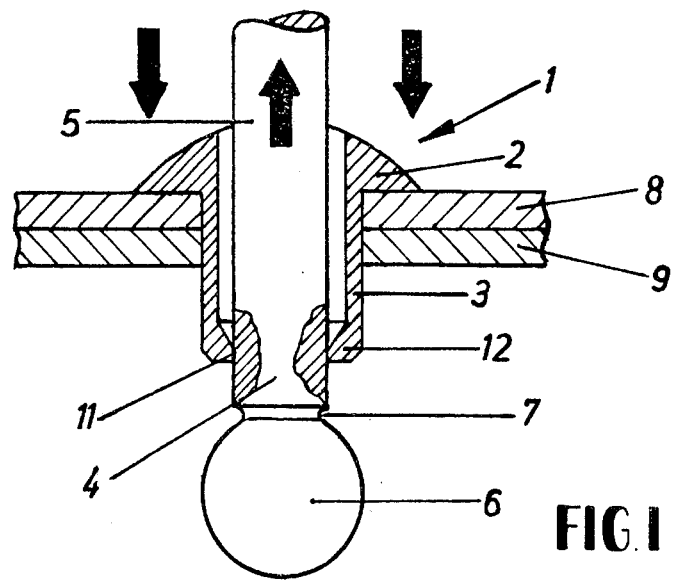
FIG. 1 is a cross section, partly in elevation, through a blind rivet embodying the invention, with the rivet just set in place and before the setting process begins.

FIG. 1 shows a blind rivet in its initial condition in which it is inserted into the aligned holes or bores of two sheet metal pieces 8 and 9 which are to be riveted together. The blind rivet consists of a single piece comprising a hollow rivet 1 and an associated setting mandrel 4 which are solidly connected together, that is, the entire blind rivet is for instance injection molded in one piece of thermoplastic synthetic material. The tubular shank or sleeve 3 of the rivet has a continuous unbroken wall to provide a watertight or leakproof seal after the rivet is set.

For the setting of the rivet, one of many well-known types of riveting tools may be used. For purposes of simplification, such riveting tool, however, is not shown in the drawings. While the closure head 10 (FIG. 3) is being formed, the mouth of the riveting tool bears upon the manufactured setting head 2 of the blind rivet and the draw shank 5 of the setting mandrel 4 is retracted into the riveting tool.

Figure 2:
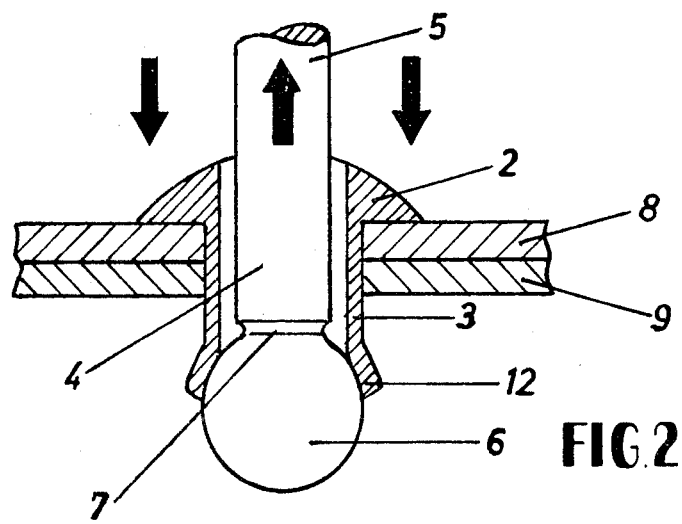
FIG. 2 is a cross section similar to FIG. 1 after the rivet has been partly set by withdrawing the setting mandrel upwardly.
Figure 3:
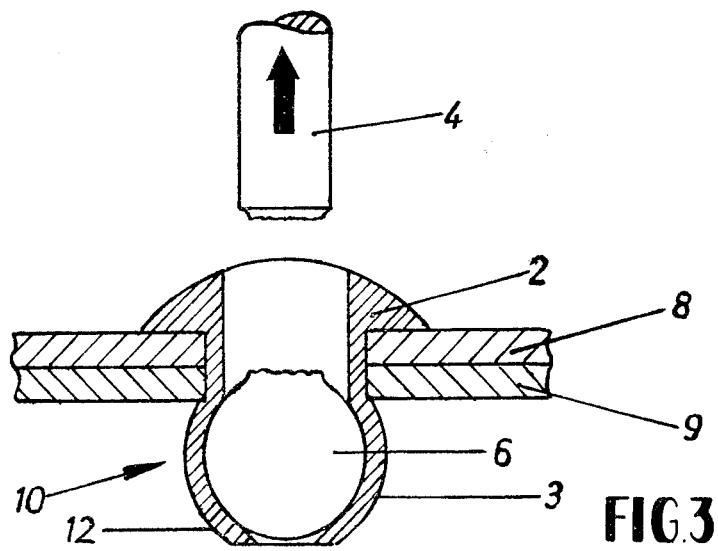
FIG. 3 is a cross section similar to FIG. 1 but in which the frangible connection between the draw shank and head of the setting mandrel has been broken and the draw shank completely removed from the blind rivet.

FIG. 2 shows an intermediate assembly stage between the initial condition of the blind rivet (FIG. 1) and the finished blind riveted connection (FIG. 3). Due to the retraction of the draw shank 5 of the setting mandrel 4, the frangible connection or break joint 11 between the shank 5 of the setting mandrel 4 and the squirted or inturned bead 12 of the sleeve portion 3 of the hollow rivet 1 ruptures and the sleeve portion 3 expands itself upon the head 6 of the setting mandrel to form itself into an envelope or cap 10 which conforms to the shape of head 6. During this operation, no fracturing stress is imposed on the break joint 7, as this break joint is axially beyond the break joint 11.

Figure 4:
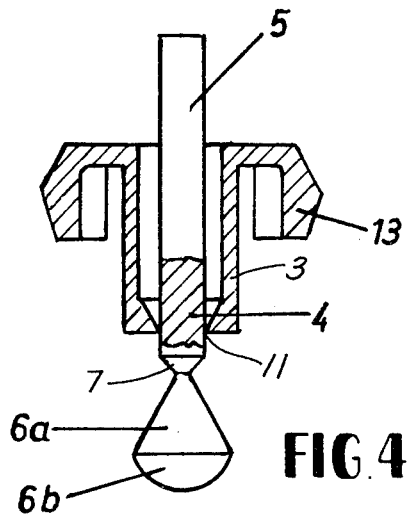
FIG. 4 is a cross section taken through a modified embodiment of the invention in which a blind rivet type fastener is integrally formed with a molding clip, and in which the upper surface of the setting mandrel head is conically shaped.
Figure 5:
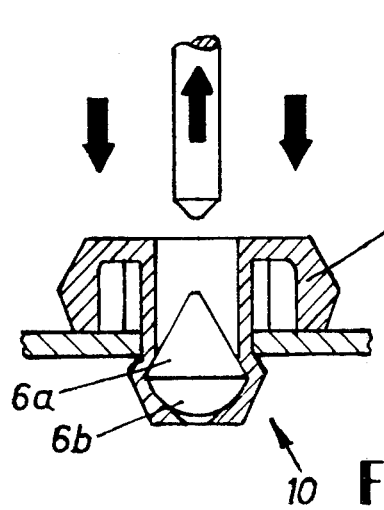
FIG. 5 is a cross section similar to FIG. 4 after the draw stem of the setting mandrel has been withdrawn from the rivet to set the rivet.
Figure 6:
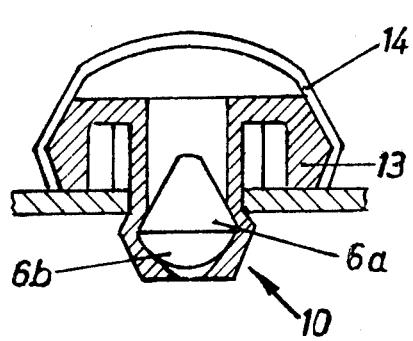
FIG. 6 is a view similar to FIG. 5 and illustrating a molding strip about the molding clip.

The head 6 of the setting mandrel may be spherical as shown, or it can also be provided with a cone, as shown in FIGS. 4–6.

After the FIG. 2 stage the head 6 of the setting mandrel is further drawn into the sleeve portion 3 of the hollow rivet 1 until the sheets 8 and 9 are firmly pressed together and the sleeve portion 3 together with the bead 12 has firmly hugged the head 6

Note that the cap 10 of hollow sleeve 3 has molded itself into a spherical configuration conforming to the spherical shape of head 6. This is because the thermoplastic material of sleeve 3 tends to return to its original shape, after deforming pressure has been relaxed.

After the closure cap 10 has been formed in this manner and no further deformation can take place, the draw shank 5 separates from the head 6 at the frangible connection or break groove 7 under the increasing pull of the rivet setting tool. This establishes the final condition of the set blind rivet as illustrated in FIG. 3. In set position, the tubular rivet shank 3 is unoccupied internally between its set head 2 and the head 6. Accordingly, the head 6 is relieved of any axial pressure which might be imposed thereon if the draw shank 5 were still connected thereto. This promotes a tight and secure riveted connection which is not subject to dislodgement. In the event that it should become necessary to disconnect the rivet, the head 6 may be forced out, for instance with a drive pin, and the hollow rivet can be withdrawn because it consists of thermoplastic material and therefore resumes its original shape, smaller than the holes in plates 8, 9.

Figure 7:
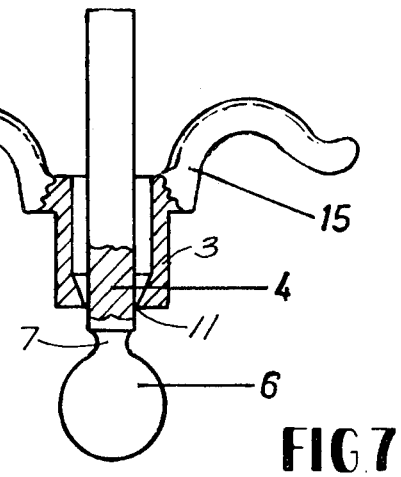
FIG. 7 is a cross section, partly in elevation, of a modified embodiment of the invention in which a blind rivet type fastener is formed integrally with a cable clamp.
Figure 8:
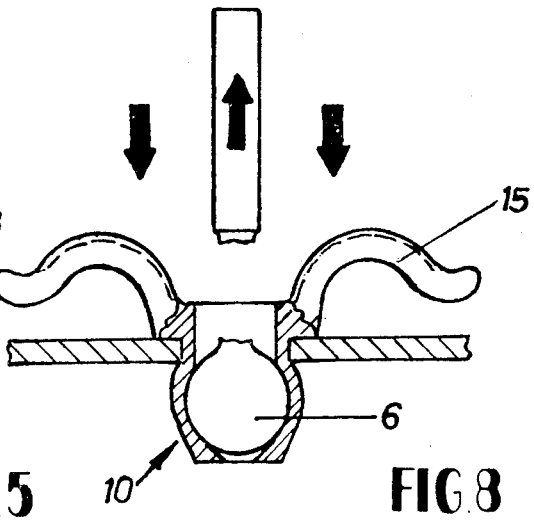
FIG. 8 is a view similar to FIG. 7 after the rivet has been set.
Figure 9:
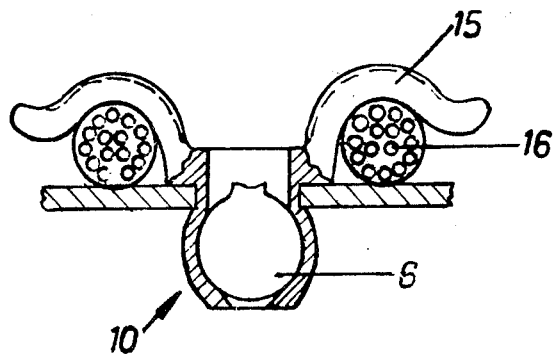
FIG. 9 is a view similar to FIG. 8 showing the cables in place.
Figure 10:
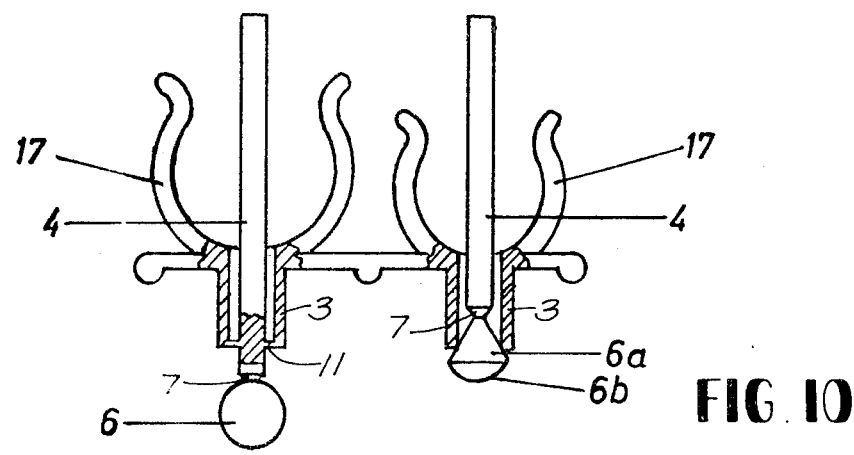
Figure 11:
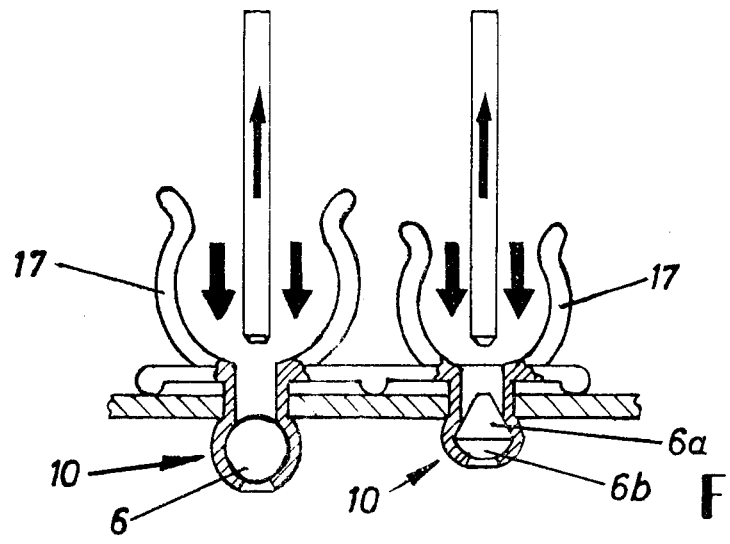
Figure 12:
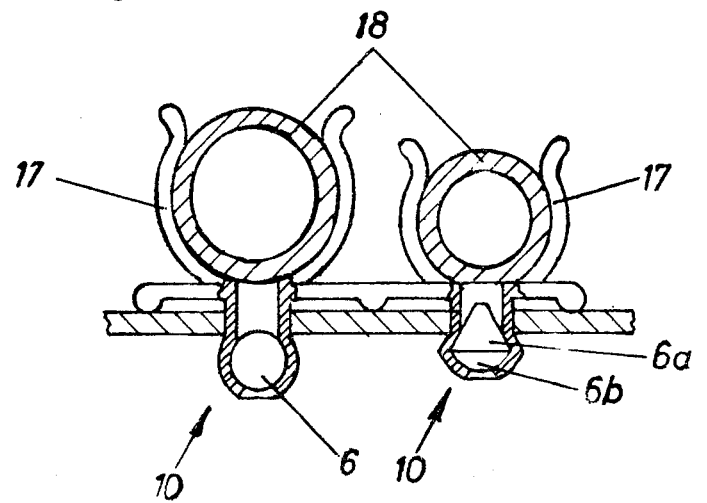

FIGS. 4–6, 7–9 respectively show embodiments of the invention involving the same principle as in FIGS. 1–3 and providing a blind rivet type foot of a fastener, the setting head of the hollow rivet being directly integrated with the fastener. In FIGS. 4–6 the fastener is a molding clip 13 for mounting a molding strip 14. FIGS. 7–9, on the other hand, show a cable clamp 15 for retaining cables 16.

The setting, that is the installation, of the fasteners of FIGS. 4–12 is accomplished in the same manner as described with reference to FIGS. 1–3. In these instances the fasteners perform a dual function, namely, blind riveting and simultaneous provision for additional fastening.

In all embodiments the head 6 of the setting mandrel is no larger than the outside diameter of the undeformed hollow rivet sleeve 3. Accordingly, the unitary rivet structure can pass through the aligned bores in plates 8, 9 of FIGS. 1–3 or through the hole in the plates illustrated in FIGS. 5, 6, 8, 9, 11 and 12. After the bead 12 and sleeve 3 have been enlarged to form cap 10, as hereinbefore described, the enlarged cap 10 cannot be withdrawn through such holes and the pieces are riveted together.

I claim:
1. A blind rivet type fastening device comprising:
   a thermo plastic hollow rivet and an integrally formed plastic setting mandrel made of the same material as the hollow rivet, said hollow rivet having an unbroken, continuous wall, hollow tubular cylindrical shank having a set head at one end of the tubular shank, said setting mandrel having a cylindrical draw shank telescopically received within said tubular rivet shank and being spaced from the tubular rivet shank by a cylindrical gap, and an enlarged mandrel head having a diameter larger than the internal diameter of the tubular rivet shank, said mandrel head extending axially beyond said tubular shank;
   a first frangible break joint extending radially inwardly from the end of the tubular shank towards the draw shank, bridging said space by a bead por- tion which establishes a readially inwardly tapered end of a blind bore establishing said cylindrical gap, said first joint and bead portion being an integral connection between the tubular shank and the draw shank of the mandrel;

a second frangible break joint axially beyond said tubular shank and located between said draw shank and said mandrel head whereby axial force exerted on the mandrel draw shank to pull the mandrel head into the tubular shank will first break the first break joint by shear forces without imposing fracturing stress on the second break joint to permit axial movement of the mandrel and pull the mandrel head into the tubular shank to form the tubular shank into a closure head having outwardly bulging contour corresponding to the contour of the mandrel head whereby said bead portion being a thickened end of the shank grips around and hugs the mandrel head; and further axial force will break the second break joint to disconnect the draw shank from the mandrel head and permit withdrawal of the draw shank from the tubular rivet shank to leave the hollow tubular rivet shank unoccupied between its set head and said enlarged mandrel head.

2. A fastening device as in claim 1 wherein the diameter of the draw shank of the setting mandrel is substantially smaller than the internal diameter of said tubular rivet shank.

3. A fastening device as in claim 2 wherein the enlarged head of the setting mandrel is ball shaped.

4. A fastening device as in claim 1 wherein the head of the setting mandrel comprises a conical portion and a ball shaped end portion, the diameter of said head being substantially larger than the internal diameter of said tubular rivet shank.

5. A fastening device as in claim 1 in which said enlarged head of the mandrel is no larger in diameter than the external diameter of the tubular rivet shank.

* * * * *